United States Patent [19]

Lindberg

[11] 4,301,781

[45] Nov. 24, 1981

[54] METHOD AND APPARATUS FOR IMPROVING ENGINE OPERATION AND REDUCING HYDROCARBONS EMISSIONS THEREFROM BY COOLING THE FUEL SUPPLIED TO OR IN THE CARBURETOR

[76] Inventor: John E. Lindberg, 1306 Sanderling Island, Point Richmond, Calif. 94801

[21] Appl. No.: 58,535

[22] Filed: Jul. 18, 1979

[51] Int. Cl.³ ............................................. F02M 31/20
[52] U.S. Cl. ..................................... 123/541; 123/540
[58] Field of Search ................ 62/316; 123/540, 541, 123/41.31

[56] References Cited

U.S. PATENT DOCUMENTS

| | | | |
|---|---|---|---|
| 1,104,958 | 7/1914 | Burrow | 62/316 |
| 1,495,525 | 5/1924 | Odell | 62/316 |
| 2,120,779 | 6/1938 | Ericson | 123/541 |
| 2,994,311 | 8/1961 | Shuck | 123/541 |
| 3,593,694 | 7/1971 | Hilborn | 123/541 |
| 4,155,337 | 5/1979 | Hensley | 123/541 |

*Primary Examiner*—Ronald H. Lazarus
*Attorney, Agent, or Firm*—Owen, Wickersham & Erickson

[57] ABSTRACT

Apparatus and method for improving the operation of an internal-combustion engine and reducing hydrocarbons emissions therefrom by cooling the fuel during its passage from the fuel supply tank to the intake manifold.

7 Claims, 1 Drawing Figure

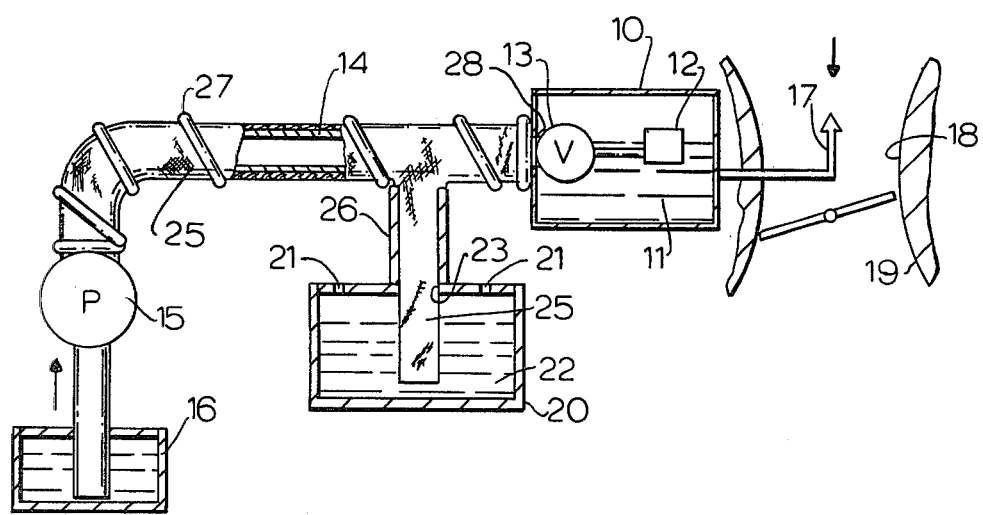

METHOD AND APPARATUS FOR IMPROVING ENGINE OPERATION AND REDUCING HYDROCARBONS EMISSIONS THEREFROM BY COOLING THE FUEL SUPPLIED TO OR IN THE CARBURETOR

BACKGROUND OF THE INVENTION

This invention relates to method and apparatus for improving the operation of internal combustion engines and of its fuel metering means. The invention applies to the type of engine having carburetors and of reducing the hydrocarbons emissions from the carburetors and engines systems. It also applies to engines using fuel injection. The invention is accomplished by cooling the fuel supplied to or in the carburetor or fuel injector, that is, in general by supplying fuel to the intake manifold at temperatures cooler than heretofore.

In modern automative vehicles, the temperatures in and around the engines have been considerably raised, even in parts which are not directly related to the operation in the combustion chamber. Thus, the low silhouette of modern cars and the packing of more and more equipment into the lower engine compartment, while trying to keep the car size relatively small have resulted in tight containment of the devices within the engine compartment, and this alone has tended to cause the engine and related equipment, such as the carburetor or fuel injector, to get hotter.

In addition, however, the temperature of the intake manifold has been raised in order to get better fuel-air distribution and to obtain improved vaporization of fuel before it enters the combustion chamber. It is important, of course, to have the fuel well vaporized within the combustion chamber, but the accomplishment of that desideratum has caused heat to be conducted from the combustion chamber, through the intake manifold, to the carburetor or fuel injector. In many instances insulating gaskets have been provided to reduce somewhat the amount of heat transmitted from the intake manifold to the carburetor or fuel injector; but these gaskets have not succeeded in preventing the carburetor or fuel injector from getting quite hot. When the engine is fully warm, the heat transmitted to a carburetor is often sufficient to heat the fuel in the carburetor bowl enough for it to boil. When this fuel boils, some of the vapor emitted therefrom passes directly into the atmospheric air from the carburetor, thereby increasing engine emissions of unburned hydrocarbons.

The boiling of the fuel in the carburetor bowl also changes the effective fuel-air ratio at the carburetor, and some of what is supposed to be air is actually nearly saturated with fuel vapor. A similar problem tends to occur with fuel injectors. This change in the fuel-air ratio reduces the engine efficiency and results in further unburned hydrocarbons entering the atmosphere, in this case from the engine exhaust. The effects of changing the fuel-air ratio in the carburetor or fuel injector in this manner are quite serious, yet under present conditions there is no way of preventing this erratic behavior, since when the fuel does boil within the carburetor or vaporize in the fuel injector, it can no longer be controlled as a liquid.

Thus, the pollution of the air and the economy of operation of the car have both been seriously affected.

In research done on combustion control systems in which additional heat has been added within the combustion system, along with turbulence and water to get better combustion control, I have discovered that operation is affected greatly by the high heat in the carburetor or fuel injector; it became extremely difficult to adjust the carburetor or fuel injector in a manner that would obtain repeatable results. Sometimes the carburetor was almost unmanageable, in the sense of one's being able to maintain a set fuel-air ratio and of being able to keep the engine operating properly, because of this excess heat.

Thus, I have found that the heat needed in the intake manifold in order to vaporize the fuel is not needed in the carburetor or fuel injector and affects performance adversely. In the intake manifold, the vaporization of the fuel enables a good, equal distribution between the cylinders of the supply of fuel and air at the proper ratio, but this ratio is adversely affected when the fuel in the carburetor or fuel injector has been heated too high so that some of the fuel enters as a liquid and some variable proportion enters as a vapor.

I have found that application of the present invention in which the fuel is cooled before it enters the intake manifold enables substantial increase in the effectiveness of the carburetor, and, as a result, in the operation of the engine. Also, the invention reduces the emissions both from the carburetor and from the engine exhaust, since the hydrocarbons supplied can be used consistently and since hydrocarbons are not passed from the carburetor into the air in substantial amounts.

SUMMARY OF THE INVENTION

The present invention improves the operation of internal-combustion engines and reduces the hydrocarbons emissions from them by cooling the fuel during its passage from the fuel supply tank to the intake manifold or at least to the carburetor jets or fuel-injector jets, preventing the boiling of fuel in the carburetor (if any) and escape therefrom into the atmosphere, and by supplying the intake manifold (or at least the carburetor or fuel injector jets) with the cooled fuel, the heating of the fuel taking place beyond the carburetor. The cooling is typically in the vicinity of 50° F. below the temperature at which fuel leaves the carburetor without this invention.

The cooling may be done by wicking water from a reservoir of water, distributing the wicked water along the outside of the fuel line, and evaporating the water along the outside of the fuel line, thereby drawing heat from the fuel. Preferably, the water is prevented from evaporating during its passage along the wick from the reservoir to the fuel line. The wick may be held in place around the fuel line by a coil spring surrounding the wick and the fuel line.

BRIEF DESCRIPTION OF THE DRAWING

The drawing is a somewhat diagrammatic view in elevation and partly in section of a portion of an engine system having a carburetor and fuel line and embodying the principles of the invention by employing a water supply and a wicking system for cooling the fuel in the fuel line.

DESCRIPTION OF A PREFERRED EMBODIMENT

Cooling the fuel in the fuel line by evaporation of water therearound

An important point of the invention is the cooling of the fuel so that the carburetor or fuel injector operates with the fuel as a liquid. This cooling of the fuel may be done in several different locations and in different manners.

FIG. 1 shows a system in which there is a carburetor 10 having a carburetor bowl 11, a float 12, and an intake valve 13 connected to a fuel line 14. The fuel line 14 has a fuel pump 15 somewhere between the carburetor 10 and a fuel tank 16. The carburetor 10, shown very diagrammatically, sends fuel by a jet 17, through which the fuel is metered, into a venturi 18 of an intake manifold 19 in the normal manner of operation. There may, of course, be more than one jet 17. In a fuel injector there are obvious differences, but these are well known.

The present invention provides a water reservoir 20 having one or more air-vent openings 21 and a sufficient supply of water 22 therein. This reservoir 20 is closed except for the air-vent and fill openings 21 and for an opening 23 through which extends a wick 25. The wick 25 is guided through an impermeable encasement 26 from the top of the water reservoir 20 to the fuel line 14, where it is arranged to surround the fuel line 14. For example, the wick 25 may be flax tape wound about one and one-half times around the fuel line 14.

Any material that will wick the water adequately may be used and the wick 25 may be wrapped around the fuel line 14 or formed into a sock-like tube and slipped over it, or split in the middle and held together by zippers or hooks or other securing devices, or held in place elastically with a wrapped-around preformed stainless steel spring 27, as shown in FIG. 1. The spring 27 may comprise, for example, a spring-wire of 0.035-inch diameter. Preferably, the wick 25 extends up to the very point 28 where the fuel line 14 enters the carburetor 10. The spring 27 may extend for the complete length of the fuel line 14 between the fuel pump 15 and the carburetor 10, holding the wick 25 between suitable supports or directly against the carburetor 10 and the fuel pump 15. An engine fan, not shown, which is present in all such engines, supplies a flow of air, and the air cools the fuel in the fuel line 14 by evaporating the water from the wick 25. This evaporation draws heat from the fuel inside the fuel line 14, cooling the fuel.

The device of FIG. 1 operates very effectively and has been found to reduce the temperature of the fuel in the carburetor 10 from 130° F. in one instance to 80°, and in another instance from 140° F. to 90° F. This approximately 50° differential is exactly what is needed to insure proper metering of the fuel as a liquid and to supply fuel to the intake manifold 19, or at least to the carburetor jets 17, in the liquid state. Similar results are obtained in a fuel-injection system. The fuel is adequately heated within the intake manifold 19 and thereafter.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for improving the operation of an internal-combustion engine and reducing hydrocarbons emissions therefrom, said engine having fuel-metering means to which an excessive amount of heat is transmitted from the engine, partly via an intake manifold so that the fuel tends to boil in the fuel-metering means and thereby to change the fuel-air ratio to which the fuel-metering means is set, the engine also having a fuel line and a fuel pump connecting the fuel-metering means to a fuel supply tank, the fuel line comprising a metal tube having walls providing an inner passage and an outside surface, comprising:

cooling the fuel during its passage from the fuel supply tank to the fuel-metering means by wicking water from a reservoir of water spaced away from said fuel line distributing the wicked water along and in contact with the outside surface of the fuel line, and evaporating the water along the outside surface of the fuel line, thereby drawing heat from the fuel through the walls of the fuel line so that the fuel enters the fuel-metering means at a temperature substantially below the ambient temperature at the fuel metering means.

2. The method of claim 1 including the step of preventing the water from evaporating during it passage along the wick from the reservoir to the fuel line.

3. The method of claim 1 comprising providing sufficient cooling by evaporation to reduce the temperature of the fuel in the fuel-metering means by approximately 50° F. from that wherein no attempt is made to cool the fuel.

4. In an internal-combustion engine having fuel-metering means for feeding a fuel-air mixture to an intake manifold and to which excessive heat is transmitted from the engine, partly via the intake manifold, and having a fuel pump and a tubular metal fuel line connecting the fuel-metering means to a fuel supply tank, the combination therewith of:

fuel cooling means for cooling the fuel during its flow from the fuel supply tank to the fuel-metering means, comprising:

a porous wick surrounding and in contact with the outside surface of the fuel line and exposed to the ambient atmosphere there, retention means holding said wick in place in said contact, and a water reservoir spaced away from said fuel line and containing water, into which a portion of the wick extends, so that the wick takes up water from said reservoir and distributes it along and in contact with at least a substantial portion of the fuel line and so that evaporation of the water from the wick cools the fuel line and the fuel therein.

5. The combination of claim 4 wherein the retention means comprises a coil spring surrounding said wick and fuel line.

6. The combination of claim 4, having an impermeable tube surrounding said wick between the fuel line and the reservoir to prevent evaporation of water from the wick in between the reservoir and the fuel line.

7. The combination of claim 4 wherein the fuel-metering means has a containing housing and said wick surrounds and is in contact with said fuel line all the way from the fuel pump to the containing housing.

* * * * *